3,153,074
REACTION OF ORGANIC ACIDS WITH
DIVINYLMERCURY
Donald J. Foster, South Charleston, and Erich Tobler, Charleston, W. Va., assignors to Union Carbide Corporation, a corporation of New York
No Drawing. Filed Oct. 17, 1961, Ser. No. 145,759
4 Claims. (Cl. 260—431)

This invention relates to a new and improved method of making vinyl esters of organic acids. It also relates to a new class of compounds, vinyl mercuric salts, and their preparation.

This application is a continuation-in-part application of application Serial No. 33,955, entitled "Process For Making Vinyl Esters," filed June 6, 1960, and now abandoned.

It is known to prepare vinyl esters of organic acids by the liquid-phase reaction of acetylene with the anhydrous acid in the presence of mercury, zinc or cadmium salts. Thus Reppe and his co-workers used acetylene under pressure at relatively high temperatures in order to obtain a variety of high vinyl esters, as described in U.S. Patents 2,066,075 and 2,156,093. As in the liquid-phase reaction of acetylene and acetic acid, the rates of vinylation and yield tend to be erratic, and are much influenced by traces of impurities and methods of preparing the catalysts. Laboratory scale production of many higher vinyl ester monomers has also been achieved by the acidolysis of vinyl acetate, as described in U.S. Patents 2,299,862 and 2,404,929.

The monovinyl and divinyl esters from dicarboxylic acids are generally difficult to prepare and purify, although the monovinyl alkyl esters have been prepared from acetylene as reported in U.S. Patent 2,153,987. Erratic behaviour is common in such reactions as in the case where phthalic anhydride and acetylene in the gas phase give vinyl benzoate rather than vinyl phthalate when passed at 320° C. over a catalyst consisting of aluminum hydroxide, zinc carbonate and cadmium acetate, as reported in U.S. Patent 2,342,463.

We have now discovered that vinyl esters of organic acids can be readily and conveniently prepared by the reaction of organic acids, either monocarboxylic or polycarboxylic, with divinylmercury. These reactants when combined at room temperature or above can react to give vinyl esters, and may first yield intermediate vinylmercuric salts, which can be isolated and recovered if desired. The vinylmercuric salts can be converted to vinyl esters by heating. In the case of dicarboxylic acids, the reaction may proceed to varying degrees on different carboxyl groups.

While any carboxylic acid can be reacted with divinylmercury in the process of the instant invention, the most preferable acids are those which can be represented by the formula $R_q(COOH)_p$ wherein $p$ is an integer having a value of from 1 to 2; $q$ is an integer having a value of 0 to 1 when $p$ is 2; and R is a hydrocarbon radical having from 1 to 32 carbon atoms, preferably from 1 to 14 carbon atoms, which hydrocarbon radical can be alkyl, cycloalkyl, alkenyl, aryl, aralkyl, alkaryl and the like when $p$ is 1, and the divalent equivalents thereof when $p$ is 2, and which hydrocarbon radical can contain chlorine, bromine, iodine and hydroxyl substituents, but preferably no more than three of such substituents.

The reactions which occur when a monocarboxylic acid is employed can be represented by the following equations:

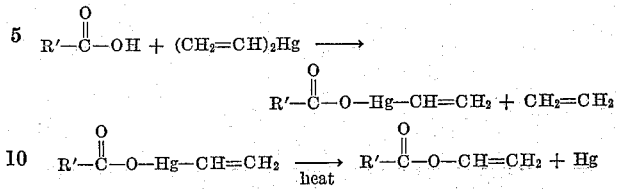

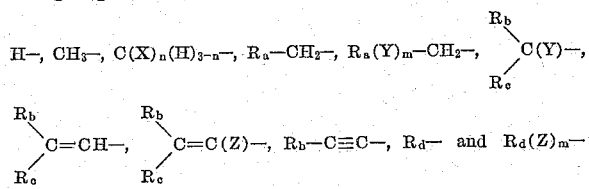

wherein R' is R as above defined when $p$ has a value of 1. In such instance, R' is preferably a member selected from the group consisting of $$H-, CH_3-, C(X)_n(H)_{3-n}-, R_a-CH_2-, R_a(Y)_m-CH_2-, \begin{matrix}R_b\\ \diagdown\\ \diagup\\ R_c\end{matrix}C(Y)-,$$

$$\begin{matrix}R_b\\ \diagdown\\ \diagup\\ R_c\end{matrix}C=CH-, \begin{matrix}R_b\\ \diagdown\\ \diagup\\ R_c\end{matrix}C=C(Z)-, R_b-C\equiv C-, R_d- \text{ and } R_d(Z)_m-$$

wherein X is a radical selected from the group consisting of chlorine, bromine, and iodine; $n$ is an integer having a value of from 2 to 3; $R_a$ is a hydrocarbon radical having from 1 to 31 carbon atoms, preferably from 1 to 13 carbon atoms; Y is a member selected from the group consisting of chlorine, bromine, iodine and hydroxyl radicals; $m$ is an integer having a value of from 1 to 3; $R_b$ and $R_c$ are members selected from the group consisting of hydrogen and hydrocarbon radicals having from 1 to 30 carbon atoms, preferably from 1 to 12 carbon atoms; Z is a member selected from the group consisting of chlorine, bromine, iodine, hydroxyl and alkyl radicals having from 1 to 6 carbon atoms; and $R_d$ is an aryl radical having from 6 to 14 carbon atoms; there being no more than 33 carbon atoms in any given acid.

When a dicarboxylic acid is employed, the reactants $HO-CO-(R'')_q-CO-OH$ and $(CH_2=CH)_2Hg$ react to yield any of the following:

(1) $HO-CO-(R'')_q-CO-O-Hg-CH=CH_2$
(2) $HO-CO-(R'')_q-CO-O-CH=CH_2$
(3) $CH_2=CH-Hg-O-CO-(R'')_p$
    $-CO-O-Hg-CH=CH_2$
(4) $CH_2=CH-O-CO-(R'')_q-CO-O-CH=CH_2$
(5) $CH_2=CH-Hg-O-CO-(R'')_q$
    $-CO-O-CH=CH_2$ wherein $q$ is an integer having a value of 0 to 1 and R'' is R as above defined when $p$ has a value of 2. In such instance, R'' is preferably a member selected from the group consisting of $-R_e-, -R_e(R_d)_m-, -C(R_b)(Y)-, -R_e(Y)_m-,$
$-C(R_b)=CH-, -C(R_b)=C(Z)-, -C\equiv C-,$
$-R_f-, -R_e-R_f \text{ and } -R_f(Z)_m-$ wherein $R_e$ is an alkylene radical having from 1 to 32 carbon atoms, preferably from 1 to 14 carbon atoms; $R_f$ is an arylene radical having from 6 to 14 carbon atoms; and $R_d$, $R_b$, Y, Z and $m$ are as above defined; there again being no more than 34 carbon atoms in any given acid.

Of the above products it will be seen that reactions can be induced whereby 1 can yield 2, 3 can yield 4 and 5, and 5 can yield 4. It should be understood, of course, that divinyl-mercury can react with either or both carboxyl groups of a dicarboxylic acid.

The rate of the overall conversion of the acid to the vinyl ester, and hence the degree to which the vinylmercuric salt intermediate is converted to the final vinyl ester product, is controlled by a number of factors. These same factors, of course, affect the extent of conversion of the different carboxyl groups on the polycarboxylic acids. The extent to which the intermediate vinylmercuric salt has been converted to the final vinyl ester product is indicated by the quantity of free mercury deposited in the reaction.

The reaction may be conducted in a solvent or diluent, although such is not necessary. In general the presence of such a solvent or diluent tends to favor the production of a vinylmercuric salt intermediate. In the absence of a solvent or diluent the reaction tends to go to completion with the formation of the final vinyl ester product. The presence of a solvent or diluent also tends to lessen the completeness of the reaction as between carboxyl groups in the case of poly-basic acids. Apparently the presence of the solvent slows down the reaction. It also promotes more intimate contact with certain types of reactants and retards polymerization.

The solvent or diluent will ordinarily be a low boiling hydrocarbon or ether solvent, although lower aliphatic alcohols have been found suitable for many of the polybasic acids. Suitable solvents include aliphatic and aromatic hydrocarbons such as pentane, hexane, heptane, benzene, toluene and xylene, as well as lower aliphatic ethers, tetrahydrofuran, tetrahydrothiophene, dioxane, and the like. Preferred solvents are aliphatic ethers containing from two to twelve carbon atoms such as methyl ether, methyl ethyl ether, ethyl ether, n-propyl ether, isopropyl ether, n-butyl ether, iso-butyl ether, amyl ethers, hexyl ethers and mixed ethers of the foregoing. Also preferred are ethers of ethylene glycol and of diethylene glycol. These include ethylene glycol dimethyl ether, ethylene glycol diethyl ether, ethylene glycol methyl ethyl ether, ethylene glycol ethyl butyl ether, ethylene glycol dibutyl ether, diethylene glycol dimethyl ether, diethylene glycol diethyl ether, diethylene glycol ethyl butyl ether, diethylene glycol dibutyl ether, diethylene glycol ethyl hexyl ether, and the like. For the poly-basic acid reactions, lower aliphatic alcohols such as methanol, ethanol, propanol and butanol are good, with ethanol preferred.

A relatively short reaction time will ordinarily favor formation of the vinylmercuric salt intermediate, while a longer reaction time favors the overall reaction to the vinyl ester. The more complete reaction of all carboxyl groups in the polycarboxylic acids is similarly favored. Lower temperatures favor the vinylmercuric salt intermediate, while higher temperatures favor the vinyl ester, as well as the more complete reaction of all carboxyl groups in polycarboxylic acids. When it is desired to convert a vinylmercuric salt to a vinyl ester, elevated temperatures are preferably employed, up to the temperatures of decomposition or polymerization of the reactants or product. When the vinylmercuric intermediate is desired, stoichiometric quantities of reactants should be used, while an excess of the carboxylic acid favors the final vinyl ester product. In the case of polycarboxylic acids, the use of less than stoichiometric quantities of divinylmercury favors reaction of less than all the carboxyl groups. All of the reactions described above are conveniently and efficiently operated at atmospheric pressure, although other pressures could be used if desired. Divinylmercury can be made by adding mercuric chloride to vinylsodium in a solvent such as butyl ether.

The vinylmercuric salts of the instant invention are generally colorless, crystalline solids having sharp melting points and soluble in the usual organic solvents such as benzene, toluene, acetone, alcohols, ethers and the like. Typical vinylmercuric salts of the invention, all of which can be converted to the corresponding vinyl esters by heating, include vinylmercuric formate, vinylmercuric acetate, vinylmercuric monochloroacetate, vinylmercuric dichloroacetate, vinylmercuric bromoacetate, vinylmercuric propionate, vinylmercuric chloropropionates, vinylmercuric butyrate, vinylmercuric chlorobutyrates, vinylmercuric valerate, vinylmercuric chlorovalerate, vinylmercuric laurate, vinylmercuric chlorolaurates, vinylmercuric acrylate, vinylmercuric methacrylate, vinylmercuric crotonate, vinylmercuric isocrotonate, vinylmercuric oleate, vinylmercuric propiolate, vinylmercuric tetrolate, vinylmercuric lactate, vinylmercuric palmitate, vinylmercuric stearate, vinylmercuric benzoate, vinylmercuric chlorobenzoates, vinylmercuric phenylacetate, vinylmercuric chlorophenylacetates, vinylmercuric toluates, vinylmercuric cinnamates, vinylmercuric phenylpropiolate, vinylmercuric phthalates, vinylmercuric chlorophthalates, vinylmercuric naphthlates, vinylmercuric diphenyl-o,o'-dicarboxylates, vinylmercuric oxalates, vinylmercuric malonates, vinylmercuric succinates, vinylmercuric glutarates, vinylmercuric adipates, vinylmercuric pimelates, vinylmercuric fumarates, vinylmercuric sebacates, vinylmercuric maleates, vinylmercuric malates, vinylmercuric salicylate, vinylmercuric mandelate and the like.

The vinylmercuric salts of the invention are, of course, useful as intermediates for the vinyl esters which they yield upon heating. They are also potent fungicides and can be used as anti-fungal additives for oil paints by adding them in the amount of 2 to 10 parts per million. They are also useful in preventing fungus attack on paper pulp prior to processing it into paper.

*Example I*

A mixture containing 25.5 grams (0.1 mol) of divinylmercury and 13.2 grams (0.22 mol) of acetic acid was heated on a steam bath for 30 minutes. The reaction mixture was taken up in 100 milliliters of ethyl ether and washed with five percent sodium bicarbonate and water. The organic layer was dried over anhydrous sodium sulfate and distilled at atmospheric pressure. A product boiling at 71–73° C. was shown to be identical with an authentic sample of vinyl acetate. The product yield was 74 percent of the theoretical. The mercury was recovered as the free metal.

*Example II*

To 25.5 grams (0.1 mol) of divinylmercury was added 6.0 grams (0.1 mol) of acetic acid at room temperature. The apparatus was connected to a gas collecting apparatus. At a temperature of 40° C. an exothermic reaction commenced which raised the reaction temperature to 90° C. The product gas was analyzed in a mass spectrometer and found to be ethylene of 98.7 mol percent purity. The reaction mixture solidified to white crystals on cooling to room temperature. The white solid was filtered off and recrystallized from petroleum ether. The crystalline solid melting at a temperature of 92.3° C. was identified by chemical and physical properties to be a novel compound, vinylmercuric acetate. The yield was 40 percent of the theoretical. In addition to vinylmercuric acetate, vinyl acetate and metallic mercury in a yield of 58 percent of the theoretical were also found in this reaction. The yield of vinylmercuric salt in this reaction could be increased to over 80 percent by carrying out the reaction in a solvent and keeping the temperature below 50° C.

*Analysis.*—Calcd for $C_4H_6HgO_2$: C, 16.74; H, 2.09; Hg, 70.0. Found: C, 16.43; H, 1.9; Hg, 69.7.

*Example III*

A 5.7 gram (0.02 mol) sample of vinylmercuric acetate was placed in a distilling flask and heated at atmospheric pressure. As the temperature was increased above 70° C., vinyl acetate distilled out of the reaction vessel and metallic mercury was deposited. The recovery of mercury was quantitative and the vinyl acetate that distilled out proved to be spectroscopically identical to an authentic sample of vinyl acetate.

The decomposition of vinylmercuric acetate into vinyl acetate and mercury was also successfully carried out in ethanol and acetic acid with identical results.

Example IV

A mixture of 5.1 grams (0.2 mol) of divinylmercury and 1.9 grams (0.02 mol) monochloroacetic acid was warmed on a steam bath for several minutes. Almost immediately the reaction commenced and metallic mercury was deposited. The organic mixture deposited crystals on cooling which, after recrystallization from petroleum ether, yielded a compound melting at a temperature of 67–69° C. This compound was identified as the novel vinylmercuric monochloroacetate. The mother liquor, on distillation, yielded vinyl monochloroacetate. Vinylmercuric monochloroacetate is slowly converted into vinyl monochloroacetate at room temperature and rapidly at a temperature of 100° C. The ultimate recovery of mercury was quantitative.

Analysis.—Calc'd for $C_4H_5ClHgO_2$: C, 14.90; H, 1.56; Hg, 62.4. Found: C, 14.73; H, 1.4; Hg, 61.9.

Example V

To 2.6 grams (0.02 mol) of dichloroacetic acid maintained at 0° C. was added 5.1 grams (0.02 mol) of divinyl-mercury. The evolution of ethylene commenced immediately and metallic mercury was deposited. Vinylmercuric dichloroacetate proved to be too unstable to isolate. The reaction mixture was therefore warmed on a steam bath for ten minutes. At this time a total of 3.55 grams, 89 percent of the theoretical, of mercury was collected. The organic material was found to be pure vinyl dichloroacetate by spectroscopic comparison with an authentic sample of vinyl dichloroacetate.

Example VI

To 16.34 grams (0.1 mol) of trichloroacetic acid maintained at a temperature of 0° C. was added 25.5 grams (0.1 mol) of divinylmercury. Ethylene was evolved exclusively as determined by mass spectrometry. The reaction mixture was heated on a steam bath for ten minutes. On cooling, 8.5 grams, 42.5 percent of the theoretical, of metallic mercury was recovered. The reaction mixture was extracted with pentane, and on removing the pentane by distillation, a compound boiling at 38–40° C. at 5 millimeters of mercury was obtained. This material proved to be identical with an authentic sample of vinyl trichloroacetate. In addition to the above products, 11.8 grams, 45 percent, of vinylmercuric chloride, were isolated. This material melted at a temperature of 184–185° C., and did not depress the melting point of an authentic sample of vinylmercuric chloride.

Analysis.—Calc'd for $C_2H_3ClHg$: C, 9.13; H, 1.14; Cl, 13.50. Found: C, 8.89; H, 1.12; Cl, 13.37.

Example VII

A mixture containing 5.1 grams (0.02 mol) of divinylmercury, 2.25 grams (0.02 mol) of acrylic acid and 50 milliliters of heptane was heated on a steam bath for 1.5 hours. Upon cooling a white crystalline solid was deposited and after two recrystallizations from heptane melted at a temperature of 83–84° C. This material was shown to be the novel vinylmercuric acrylate. The yield was 3.2 grams or 55 percent of the theoretical. Some polymeric material was also obtained from this reaction. In the absence of a solvent or in excess acrylic acid only polymeric material could be obtained.

Analysis.—Calc'd for $C_5H_6HgO_2$: C, 20.07; H, 2.01; Hg, 67.0. Found: C, 19.92; H, 2.13; Hg, 66.8.

Example VIII

A mixture containing 15.3 grams (0.06 mol) of divinylmercury, 10 grams (0.14 mol) of acrylic acid and 50 milliliters of heptane was heated on a steam bath for several hours. The reaction mixture was subsequently cooled and the supernatant liquid was removed from the polymeric residue and metallic mercury. The product was diluted with ethyl ether and washed with a saturated solution of sodium bi-carbonate and finally with water. Distillation of the organic phase yielded a liquid boiling at a temperature of 92–94° C., which proved to be spectroscopically identical with an authentic sample of vinyl acrylate. The yield was calculated to be 78 percent of the theoretical.

Example IX

The novel compound, vinylmercuric benzoate, was prepared by warming 5.1 grams (0.02 mol) of divinylmercury and 2.44 grams (0.02 mol) of benzoic acid on a steam bath for 15 minutes. On cooling, the white crystalline vinylmercuric benzoate was obtained. After two recrystallizations from petroleum ether, the product melted at a temperature of 68–69° C.

Analysis.—Calc'd for $C_9H_8HgO_2$: C, 31.00; H, 2.29; Hg, 57.4. Found: C, 30.91; H, 2.27; Hg, 57.2.

Example X

Heating 1.7 grams (0.005 mol) of vinylmercuric benzoate in ten milliliters of heptane on a steam bath for 12 hours resulted in a quantitative recovery of mercury and the formation of vinylbenzoate. Vinylbenzoate was identified by a spectroscopic comparison with an authentic sample.

Example XI

A mixture containing 25.5 grams (0.1 mol) of divinylmercury, 13.8 grams (0.1 mol) of salicylic acid and 50 milliliters of benzene was heated on a steam bath for 30 minutes. Ethylene evolution, as determined by a mass spectrometer analysis of the gaseous product, commenced immediately. The reaction solvent was removed in vacuo and the solid product washed with cold petroleum ether. A white crystalline product, melting at a temperature of 106–108° C., was obtained. This material was identified as the novel vinylmercuric salicylate by elemental and spectroscopic analysis, as well as hydrochloric acid cleavage to vinylmercuric chloride and salicylic acid. The yield was 32.8 grams, which represented a yield of 90 percent of the theoretical.

Analysis.—Calc'd for $C_9H_8HgO_3$: C, 29.62; H, 2.19; Hg, 55.1. Found: C, 29.6; H, 2.08; Hg, 55.0.

Example XII

A mixture containing 12.73 grams (0.05 mol) of divinylmercury, 2.9 grams (0.025 mol) of maleic acid, 25 milliliters of ethanol and one drop of water was heated on a steam bath for an hour. A total of 9.5 grams of metallic mercury was deposited. This represented a mercury recovery of 95 percent of the theoretical. The supernatant liquid was distilled under a reduced pressure of 1 millimeter of mercury to yield 2.21 grams of a water-white liquid boiling at a temperature of 80–82° C. The refractive index, $n_D^{20}$, was 1.4582 and the neutralization equivalent was 147.6. The elemental analysis and infrared spectrum were consistent with monovinyl maleate.

Analysis.—Calc'd for $C_6H_6O_4$: C, 50.71; H, 4.26. Found: C, 50.55; H, 4.13.

Example XIII

A mixture containing 0.83 gram (3.24 millimols) of divinylmercury and 0.46 gram (3.24 millimols) of monovinyl maleate, prepared as described above, was heated on a steam bath for 20 minutes. During this time 0.3 gram of metallic mercury was deposited. The supernatant liquid was distilled and a fraction boiling at 40–42° C. under a reduced presure of 0.3 millimeter of mercury was collected and analyzed. The refractive index, $n_D^{20}$, was 1.4550, and the elemental and infrared analysis were consistent with divinyl maleate.

Analysis.—Calc'd for $C_8H_8O_4$: C, 57.14; H, 4.80. Found: C, 57.19; H, 4.69.

Example XIV

A mixture containing 12.73 grams (0.05 mol) of divinylmercury, 2.90 grams of (0.025 mol) fumaric acid, 25 milliliters of ethanol and one drop of water was heated on a steam bath for one hour. Ethylene was immediately evolved and a white solid precipitated which was found to melt at a temperature of 242° C. with decomposition. The crude product weighed 14 grams, representing an 82 percent yield of mono-vinylmercuric fumarate. The product was identified by infrared and elemental analysis, and hydrochloric acid cleavage to fumaric acid and vinylmercuric chloride.

*Analysis.*—Calc'd for $C_6H_6HgO_4$: C, 21.03; H, 1.77. Found: C, 21.22; H, 1.82. A sample of the monovinylmercuric fumarate thus obtained was placed in a sublimator and maintained at a temperature between 160° C. and 180° C. for a period of four hours under a reduced pressure of 10 millimeters of mercury. The sublimate thus obtained was dissolved in ethanol and filtered to remove metallic mercury. Evaporation of the ethanol gave a solid which was then recrystallized from hexane. The white crystals thus obtained melted at a temperature of 97° C.–98.5° C. The infrared spectrum and neutralization equivalent proved the compound to be the monovinyl ester of fumaric acid.

Example XV

A mixture of 25.5 grams (0.1 mol) of divinylmercury, 16.65 grams (0.1 mol) of phthalic acid and 50 milliliters of benzene was heated on a steam bath for 1.5 hours. The supernatant liquid was removed from the resulting greyish solids which were then washed with hot ethanol and filtered. Evaporation of the ethanol left a greyish-white solid, which, after recrystallization from ethanol, melted at a temperature of 146° C. with decomposition. The product was proved to be the divinylmercuric ester of phthalic acid.

*Analysis.*—Calc'd for $C_{12}H_{10}Hg_2O_4$: C, 23.26; H, 1.63. Found: C, 22.92; H, 1.68.

Example XVI

A mixture containing 12.73 grams (0.05 mol) of divinylmercury, 3.65 grams (0.025 mol) of adipic acid and 25 milliliters of xylene was heated to reflux for one hour. The hot supernatant liquid was separated from the metallic mercury, 4.67 grams or 46.7 percent of the theoretical. Upon cooling, a white solid precipitated, which, after recrystallization from benzene, melted at 138–139.5° C. This material was identified as bis-(vinylmercuric) adipate by infrared and elemental analysis. The yield was 2.05 grams.

*Analysis.*—Calc'd for $C_{10}H_{14}Hg_2O_4$: C, 20.04; H, 2.36. Found: C, 20.51; H, 2.25. Distillation of the mother liquor gave 1.86 grams (81 percent) of divinyl adipate boiling at 76–78° C. under a reduced pressure of 0.5 millimeter of mercury. $n_D^{20}=1.4549$, Freezing Point, 15° C.

Example XVII

A 1.66 gram sample (2.77 millimols) of bis(vinylmercuric) adipate was heated to 130° C. for three hours in the absence of a solvent. During this time a total of 0.92 gram of metallic mercury was deposited, representing a mercury recovery of 83 percent of the theoretical. The liquid product was distilled at 70–72° C. under a reduced pressure of 0.3 millimeter of mercury to yield 0.33 grams of a water white liquid, $n_D^{20}$ 1.4545, which was shown to be identical with an authentic sample of divinyladipate prepared by an alternate synthesis. The yield of pure divinyl adipate was 72.6 percent of the theoretical.

Example XVIII

A mixture containing 12.7 grams (0.05 mol) of divinylmercury, 4.2 grams (0.025 mol) of isophthalic acid and 25 milliliters of toluene was refluxed for one hour. The reaction mixture was filtered to remove metallic mercury and then distilled under reduced pressure. The distillate solidified upon cooling, and after recrystallization from ethanol, the product was white needle-like crystals which melted at a temperature of 60° C.–61° C. This product was proved to be identical with an authentic sample of divinyl isophthalate. The yield was 63 percent of the theoretical.

What is claimed is:

1. A process for making a member selected from the group consisting of vinyl esters, vinylmercuric salts, and a mixture of vinyl esters and vinylmercuric salts, which comprises reacting divinylmercury with an organic carboxylic acid.

2. A process for making a member selected from the group consisting of vinyl esters, vinylmercuric salts, and a mixture of vinyl esters and vinylmercuric salts, which comprises reacting divinylmercury with an organic carboxylic acid having the formula $R_q(COOH)_p$ wherein $p$ is an integer having a value of from 1 to 2; $q$ is an integer having a value of 1 when $p$ is 1, and a value of 0 to 1 when $p$ is 2; and R is a hydrocarbon radical having from 1 to 32 carbon atoms, which hydrocarbon radical can contain chlorine, bromine, iodine and hydroxyl substituents.

3. A process for making a member selected from the group consisting of vinyl esters, vinylmercuric salts, and a mixture of vinyl esters and vinylmercuric salts, which comprises reacting divinylmercury with an organic carboxylic acid having the formula R′—COOH wherein R′ is a member selected from the group consisting of

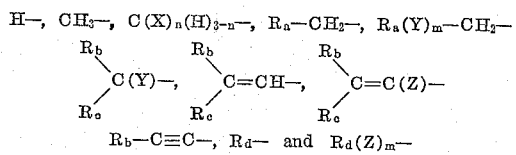

wherein X is a radical selected from the group consisting of chlorine, bromine and iodine; $n$ is an integer having a value of from 2 to 3; $R_a$ is a hydrocarbon radical having from 1 to 31 carbon atoms; Y is a member selected from the group consisting of chlorine, bromine, iodine and hydroxyl radicals; $m$ is an integer having a value of from 1 to 3; $R_b$ and $R_c$ are members selected from the group consisting of hydrogen and hydrocarbon radicals having from 1 to 30 carbon atoms; Z is a member selected from the group consisting of chlorine, bromine, iodine, hydroxyl and alkyl radicals having from 1 to 6 carbon atoms; and $R_d$ is an aryl radical having from 6 to 14 carbon atoms; there being no more than 33 carbon atoms in said acid.

4. A process for making a member selected from the group consisting of vinyl esters, vinylmercuric salts, and a mixture of vinyl esters and vinylmercuric salts, which comprises reacting divinylmercury with an organic carboxylic acid having the formula

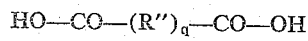

wherein $q$ is an integer having a value of 0 to 1 and R″ is a member selected from the group consisting of

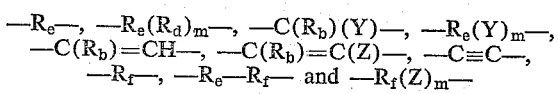

wherein $R_e$ is an alkylene radical having from 1 to 32 carbon atoms; $R_f$ is an arylene radical having from 6 to 14 carbon atoms; $R_d$ is an aryl radical having from 6 to 14 carbon atoms; $R_b$ is a member selected from the group consisting of hydrogen and hydrocarbon radicals having from 1 to 30 carbon atoms; Y is a member selected from the group consisting of chlorine, bromine, iodine and hydroxyl radicals; Z is a member selected from the group consisting of chlorine, bromine, iodine, hydroxyl and alkyl radicals having from 1 to 6 carbon atoms; and $m$ is an integer having a value of from 1 to 3; there being no more than 34 carbon atoms in said acid.

References Cited in the file of this patent

UNITED STATES PATENTS

| | | |
|---|---|---|
| 2,512,307 | Clinton et al. | June 20, 1950 |
| 2,607,790 | Sowa | Aug. 19, 1952 |
| 2,692,204 | Nowak | Oct. 19, 1954 |
| 2,842,585 | Morren | July 8, 1958 |
| 2,917,526 | Klös et al. | Dec. 15, 1959 |
| 2,967,191 | Flenner | Jan. 3, 1961 |
| 2,987,532 | Foster et al. | June 6, 1961 |

OTHER REFERENCES

Ichikawa et al.: Journal of American Chemical Society, vol. 81, 1959, pages 3401–3404.

Chemical Society Proceedings, 1958, page 116.